US010394306B2

(12) United States Patent
Mori (10) Patent No.: US 10,394,306 B2
(45) Date of Patent: Aug. 27, 2019

(54) RECORDING MEDIUM AND CRADLE APPARATUS (71) Applicant: Brother Kogyo Kabushiki Kaisha, Nagoya-shi, Aichi-ken (JP)

(72) Inventor: Hiroko Mori, Handa (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/143,522

(22) Filed: Sep. 27, 2018

(65) Prior Publication Data

US 2019/0179400 A1 Jun. 13, 2019

(30) Foreign Application Priority Data

Dec. 8, 2017 (JP) .................................. 2017-235846

(51) Int. Cl.
*G06F 3/12* (2006.01)
*G06F 9/445* (2018.01)
*G06F 1/3234* (2019.01)

(52) U.S. Cl.
CPC .......... *G06F 1/3284* (2013.01); *G06F 3/1229* (2013.01); *G06F 3/1236* (2013.01); *G06F 9/445* (2013.01)

(58) Field of Classification Search
USPC ....................................................... 358/1.14
See application file for complete search history.

(56) References Cited

U.S. PATENT DOCUMENTS 5,953,552 A * 9/1999 Someya ................. G03G 15/80
347/112
2016/0042337 A1 2/2016 Ota et al.
2016/0283420 A1* 9/2016 Haga ....................... G06F 13/24

FOREIGN PATENT DOCUMENTS

JP 2016-048537 A 4/2016

* cited by examiner

*Primary Examiner* — Neil R McLean
*Assistant Examiner* — Darryl V Dottin
(74) *Attorney, Agent, or Firm* — Banner & Witcoff, Ltd.

(57) ABSTRACT

A non-transitory computer-readable recording medium stores a cradle control program for executing steps on a CPU of a cradle apparatus. In an attachment determination step, it is determined whether or not a printer is attached to an attach/detach part. In an information acquisition step, connection identification information of the printer is acquired in the case that it is determined the printer is attached. In a connection establishing step, a communication connection with an operation terminal via the connection part is established after acquiring the connection identification information in the information acquisition step. In an information transmission step, the connection identification information acquired is transmitted to the operation terminal after establishing the communication connection in the connection establishing step.

6 Claims, 5 Drawing Sheets

INPUT/OUTPUT SIGNAL

| CPU PORT | FUNCTION NAME | INPUT/OUTPUT | LOGIC "0" | LOGIC "1" |
|---|---|---|---|---|
| P21 | USBF_ON | OUTPUT | USB UNUSABLE | USB USABLE |
| INTP05 | CPU_VBUS | INPUT | USB CONNECTION DETECTED | USB UNCONNECTED |
| UDPF | CPU_UDP | INPUT/OUTPUT | USB FUNCTION DATA SIGNAL LINE D+ | |
| UDMF | CPU_UDM | INPUT/OUTPUT | USB FUNCTION DATA SIGNAL LINE D- | |

[FIG. 3B]

POWER SOURCE OUTPUT TO PRINTER

| CPU PORT | FUNCTION NAME | INPUT/OUTPUT | LOGIC "0" | LOGIC "1" |
|---|---|---|---|---|
| P60 | POWER SOURCE OUTPUT | OUTPUT | OFF | ON |

[FIG. 3C]

PRINTER ATTACHMENT DETECTION SWITCH

| CPU PORT | FUNCTION NAME | INPUT/OUTPUT | "H" | "L" |
|---|---|---|---|---|
| INTP02 | PRINTER ATTACHMENT DETECTION | INPUT | NOT CONNECTED | CONNECTED |

[FIG. 4]

RECORDING MEDIUM AND CRADLE APPARATUS

CROSS-REFERENCE TO RELATED APPLICATION

The present application claims priority from Japanese Patent Application No. 2017-235846, which was filed on Dec. 8, 2017, the disclosure of which is incorporated herein by reference in its entirety.

BACKGROUND

Field

The present disclosure relates to a recording medium storing a control program of a cradle apparatus allowing attachment of a printer in an information transmittable/receivable manner, and a cradle apparatus thereof.

Description of the Related Art

A cradle apparatus allowing attachment of a printer in an information transmittable/receivable manner is known. This cradle apparatus is network-connected via a LAN to an operation terminal (tablet terminal) and has a function of converting and transmitting a signal from the operation terminal to an attached printer (mobile printer) and conversely converting and transmitting a signal from the printer to the operation terminal.

In the cradle apparatus connected to the operation terminal as described above, it is usually necessary to install a device driver for the cradle apparatus to the operation terminal. As a result, even when the printer is not attached to the cradle apparatus, an icon of the cradle apparatus is confusingly displayed on a screen of the operation terminal after the installation, which hinders user's convenience.

SUMMARY

An object of the present disclosure is to provide a recording medium and a cradle apparatus capable of eliminating the icon display of the cradle apparatus on an operation terminal and improving user's convenience.

In order to achieve the above-described object, according to the first aspect of the present application, there is provided a non-transitory computer-readable recording medium storing a cradle control program for executing steps on a CPU of a cradle apparatus including an attach/detach part configured to allow attachment of a printer in an information transmittable/receivable manner, a connection part configured to be wired in an information transmittable/receivable manner to an operation terminal for operating the printer, and the CPU, the steps comprising an attachment determination step for determining whether or not the printer is attached to the attach/detach part, an information acquisition step for acquiring connection identification information of the printer in the case that, in the attachment determination step, it is determined the printer is attached, a connection establishing step for establishing a communication connection with the operation terminal via the connection part after acquiring the connection identification information in the information acquisition step, and an information transmission step for transmitting to the operation terminal the connection identification information acquired in the information acquisition step after establishing the communication connection in the connection establishing step.

In order to achieve the above-described object, according to the second aspect of the present application, there is provided a cradle apparatus comprising an attach/detach part configured to allow attachment of a printer in an information transmittable/receivable manner, a connection part configured to be wired in an information transmittable/receivable manner to an operation terminal for operating the printer, and a CPU, the CPU being configured to execute an attachment determination process for determining whether or not the printer is attached to the attach/detach part, an information acquisition process for acquiring connection identification information of the printer in the case that, in the attachment determination process, it is determined that the printer is attached, a connection establishing process for establishing a communication connection with the operation terminal via the connection part after acquiring the connection identification information in the information acquisition process, and an information transmission process for transmitting to the operation terminal the connection identification information acquired in the information acquisition process after establishing the communication connection in the connection establishing process.

DETAILED DESCRIPTION OF THE PREFERRED EMBODIMENTS

An embodiment of the present disclosure will now be described with reference to the drawings.

<General Configuration of Cradle Apparatus>

Figure 1:
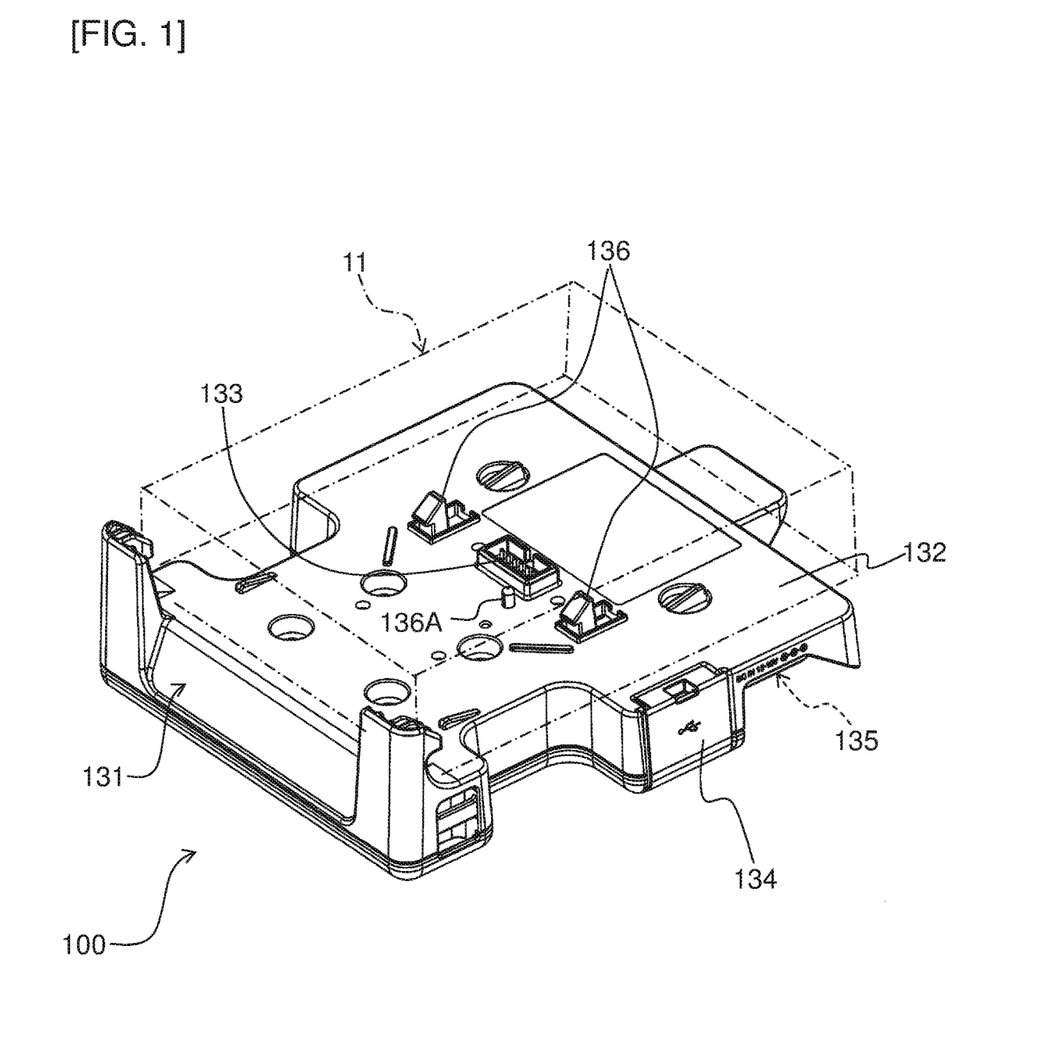
FIG. 1 is a perspective view showing an overall structure of a cradle apparatus according to an embodiment of the present disclosure.

FIG. 1 is a perspective view showing a cradle apparatus of this embodiment. In FIG. 1, a cradle apparatus 100 has a housing 131.

An upper surface of the housing 131 has a planar placement part 132 (corresponding to an example of an attach/detach part) formed such that, for example, a mobile printer 11 (corresponding to an example of a printer) can be placed and attached. At substantially the center of the upper surface of the placement part 132, a locking mechanism 136 is disposed as a pair of left and right portions projecting upward from the placement part 132. A printer detection switch 136A (corresponding to an example of a detection device; see also FIG. 2 described later) is disposed on a base portion of the lock mechanism 136. On the other hand, an electrode terminal not shown is disposed on a bottom surface of the printer 11. Correspondingly, a connector terminal 133 for transmitting/receiving information to/from the printer 11 is disposed on the placement part 132 at a position facing the electrode terminal when the printer 11 is attached.

A jack cover 134 and a DC jack 135 (see also FIG. 2 described later) for connecting to a DC power source are disposed on a side surface of the housing 131. A USB jack 17 (corresponding to an example of a connection part: see FIG. 2 described later) is stored inside the jack cover 134, and a USB cable UC1 (see FIG. 2 described later) is attached to the USB jack 17. The cradle apparatus 100 is connected through the USB cable UC1 to an operation terminal 10 (see FIG. 2 described later) including, for example, a personal computer, in an information transmittable/receivable manner. By opening the jack cover 134, the USB jack 17 is exposed to the outside of the housing 131 and becomes usable. A DC plug connected to an external power source device not shown is attached to the DC jack 135, and electric power from the external power source device is thereby supplied into the cradle apparatus 100. By supplying this electric power to the printer 11 via the connector terminal 133, the printer 11 can also be charged. The printer 11 includes a USB jack 11A, and this USB jack 11A is connected through a USB cable UC2 to the operation terminal 10 in an information transmittable/receivable manner (see FIG. 2 described later).

When the printer 11 is placed on the placement part 132 of the cradle apparatus 100 having the configuration described above, the printer 11 is locked by the lock mechanism 136, and the printer detection switch 136A is put into an "ON" state. The electrode terminal of the printer 11 is fitted to the connector terminal 133 of the cradle apparatus 100, so that the electrode terminal and the connector terminal 133 are electrically connected (made conductive).

<Circuit Configuration>

Figure 2:
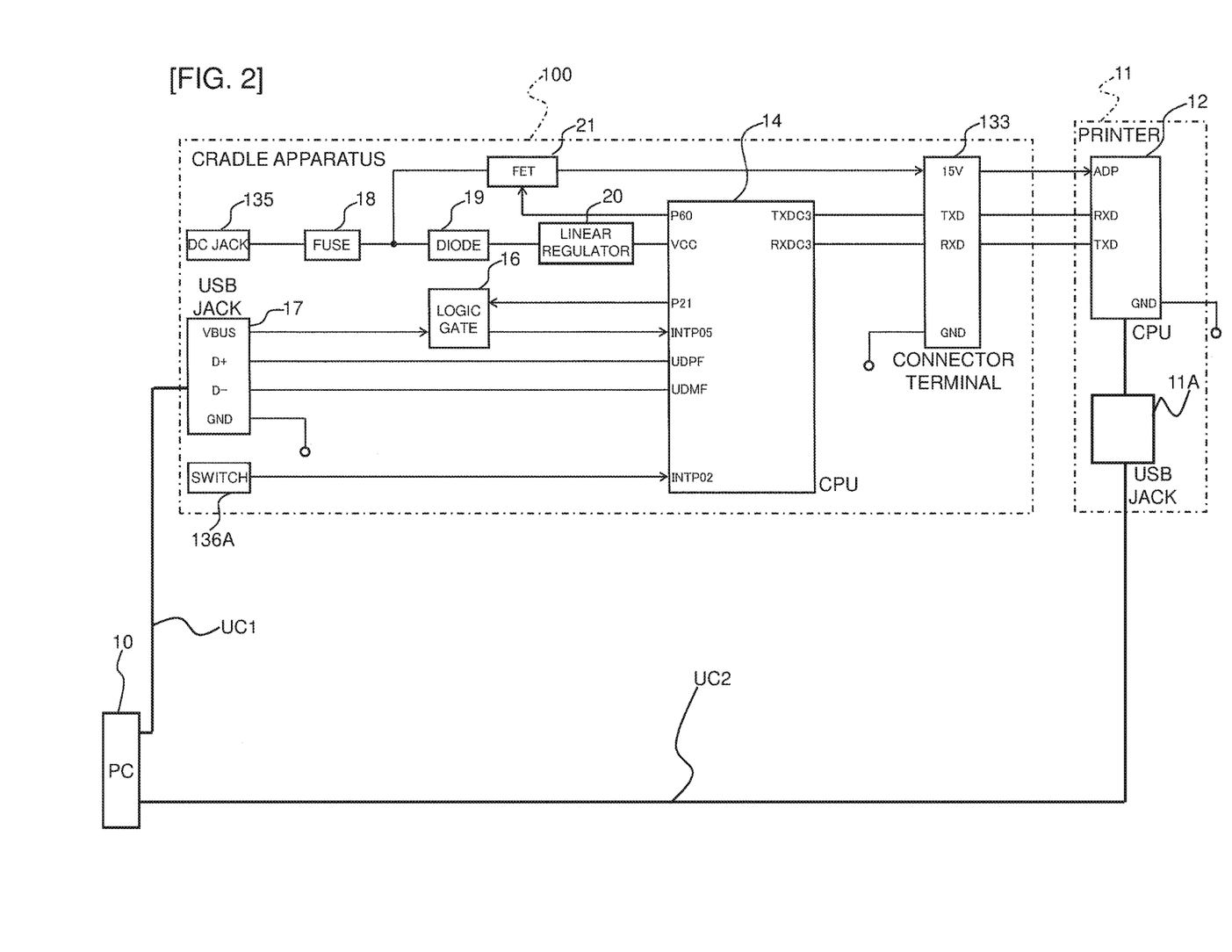
FIG. 2 is a circuit diagram showing a circuit configuration of the cradle apparatus.

FIG. 2 is a circuit diagram showing a circuit configuration of the cradle apparatus 100.

In a circuit shown in FIG. 2, the cradle apparatus 100 includes a CPU 14, the connector terminal 133, the USB jack 17 connected to the operation terminal 10 (abbreviated as "PC" in the figure), the DC jack 135, and the printer detection switch 136A.

Figures 3A, 3B:
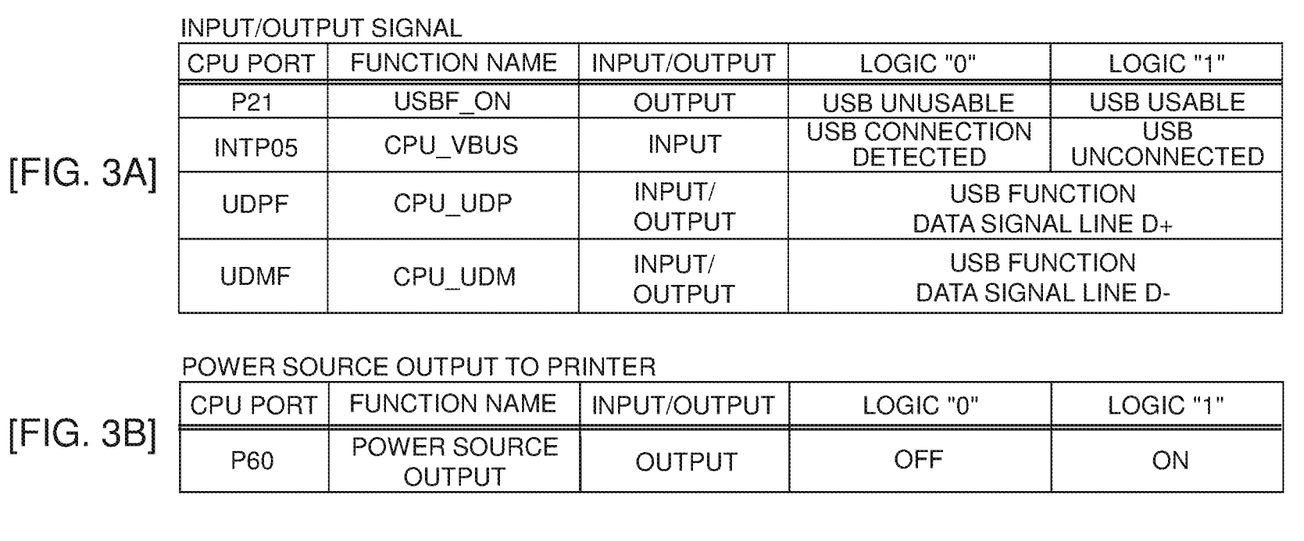
FIG. 3A is an explanatory diagram showing detailed functions of input/output signals at ports of a CPU of the cradle apparatus.
FIG. 3B is an explanatory diagram showing detailed functions of input/output signals at ports of the CPU of the cradle apparatus.

The DC jack 135 is connected through a fuse 18, a diode 19, and a linear regulator 20 to a "VCC" port of the CPU 14. A power supply circuit branched from between the fuse 18 and the diode 19 is connected through a FET 21 to a "15V" port of the connector terminal 133. This "15V" port is further connected to an "ADP" port for automatic data processing of the CPU 12 included in the printer 11. The FET 21 is controlled by a control signal from a "P60" port of the CPU 14. Therefore, as shown in FIG. 3B, when the signal output from the "P60" port is "1", the FET 21 is turned on, and power is supplied to the printer 11 through the path described above. When the signal outputted from the "P60" port is "0", the FET 21 is turned off, resulting in a cutoff state without power supply.

A "TXDC3" port for information transmission of the CPU 14 is connected to a "TXD" port for information transmission of the connector terminal 133, and the "TXD" port is further connected to an "RXD" port for information reception of the CPU 12. An "RXDC3" port for information reception of the CPU 14 is connected to an "RXD" port for information reception of the connector terminal 133, and the "RXD" port is further connected to a "TXD" port for information transmission of the CPU 12. In this way, each of the "TXD" ports is connected by a so-called UART (abbreviation for Universal Asynchronous Receiver Transmitter, which is a type of a serial communication device) connected to the "RXD" port of the partner. To send 1-byte 8-bit data, the data is decomposed in time series and output (transmitted) or input (received) by one bit at a time.

Both the connector terminal 133 and the CPU 12 of the printer 11 are grounded at "GND" ports.

On the other hand, a "VBUS" port of the USB jack 17 is connected via a logic gate 16 to an "INTP05" port of the CPU 14. A "P21" port of the CPU 14 is connected to the logic gate 16, and the logic gate 16 is controlled by a control signal (hereinafter referred to as a "USBF_ON" signal as appropriate) from the "P21" port of the CPU 14.

Therefore, as shown in FIG. 3A, when the "USBF_ON" signal output from the "P21" port is "1", the logic gate 16 is turned on (into a signal transmission state) so that a signal can be transmitted from the "VBUS" port or the USB jack 17 to the "INTP05" port of the CPU 14. As a result, as shown in FIG. 3A, the signal input to the "INTP05" port is "0" corresponding to a USB-connection-detected state so that the cradle apparatus 100 and the operation terminal 10 can electrically be connected by using the USB cable UC1 attached to the USB jack 17.

On the other hand, when the "USBF_ON" signal output from the "P21" port is "0", the logic gate 16 is turned off (into a signal cutoff state) so that a signal cannot be transmitted from the "VBUS" port of the USB jack 17 to the "INTP05" port of the CPU 14. As a result, as shown in FIG. 3A, the signal input to the "INTP05" port is "1" corresponding to a USB-unconnected state so that the electrical connection using the USB cable UC1 attached to the USB jack 17 is cut off between the cradle apparatus 100 and the operation terminal 10.

A "D+" port of the USB jack 17 is connected to an "UDPF" port of the CPU 14, and as shown in FIG. 3A, the CPU 14 identifies a USB function data signal line to the "D+" port at this "UDPF" port. Similarly, a "D−" port of the USB jack 17 is connected to a "UDMF" port of the CPU 14, and as shown in FIG. 3A, the CPU 14 identifies a USB function data signal line to the "D−" port at this "UDMF" port. The USB jack 17 is also grounded at "GND".

Figure 3C:
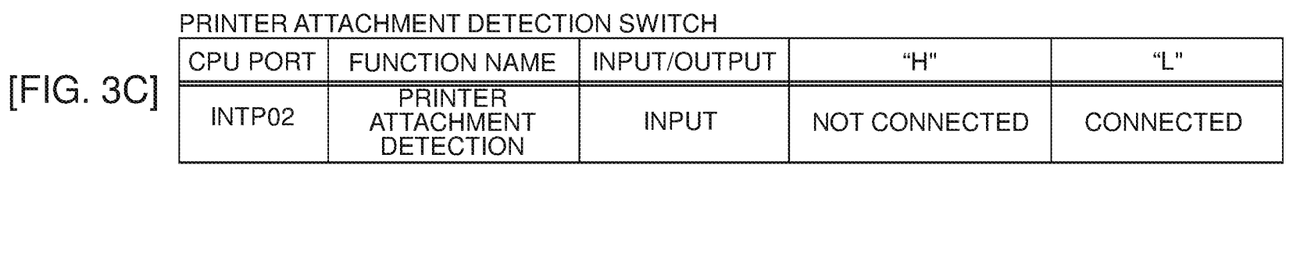
FIG. 3C is an explanatory diagram showing detailed functions of input/output signals at ports of the CPU of the cradle apparatus.

The printer detection switch 136A is connected to an "INTP02" port of the CPU 14. In the case that the printer 11 is attached to the placement part 132, as shown in FIG. 3C, the signal output from the printer detection switch 136A and input to the "INTP02" port is in a "Low" state indicative of attachment of the printer 11. When the printer 11 is detached from the placement part 132, as shown in FIG. 3C, the signal output from the printer detection switch 136A and input to the "INTP02" port is in a "High" state indicative of non-attachment of the printer 11. In this way, whether or not the printer 11 is attached to the placement part 132 is determined by using "High" and "Low" input of the signal at the "INTP02" port. The attachment of the printer 11 may be detected on condition that both the "Low" state of the signal from the printer detection switch 136A and the signal input from the printer 11 via the connector terminal 133 are present. This can prevent erroneous detection of the attachment of the printer 11, for example, when a user presses the printer detection switch 136A by hand.

Although not shown in FIG. 2, the cradle apparatus 100 includes a ROM as a recording medium. The ROM stores various control programs required for the cradle apparatus 100 to operate, including a cradle control program for executing a flowchart shown in FIG. 4 described later. The CPU 14 controls the parts in accordance with the program read from the ROM and executes the flowchart shown in FIG. 4 described later.

Background and Outline of Embodiment

The cradle apparatus 100 has a function of converting and transmitting a signal from the operation terminal 10 to the printer 11 attached to the placement part 132 and conversely converting and transmitting a signal from the printer 11 to the operation terminal 10. Therefore, it is usually necessary to install a device driver for the cradle apparatus 100 to the operation terminal 10. In this case, even when the printer 11 is not attached, an icon of the cradle apparatus 100 is confusingly displayed on a screen of the operation terminal 10 after the installation.

Therefore, in this embodiment, the cradle apparatus 100 acquires and transmits connection identification information (described later) of the printer 11 to the operation terminal 10 and thereby establishes the communication connection (electrical connection) between the cradle apparatus 100 and the operation terminal 10, eliminating the need to install the device driver. The details will hereinafter be described with reference to FIG. 4 in order.

<Control Flow>

Figure 4:
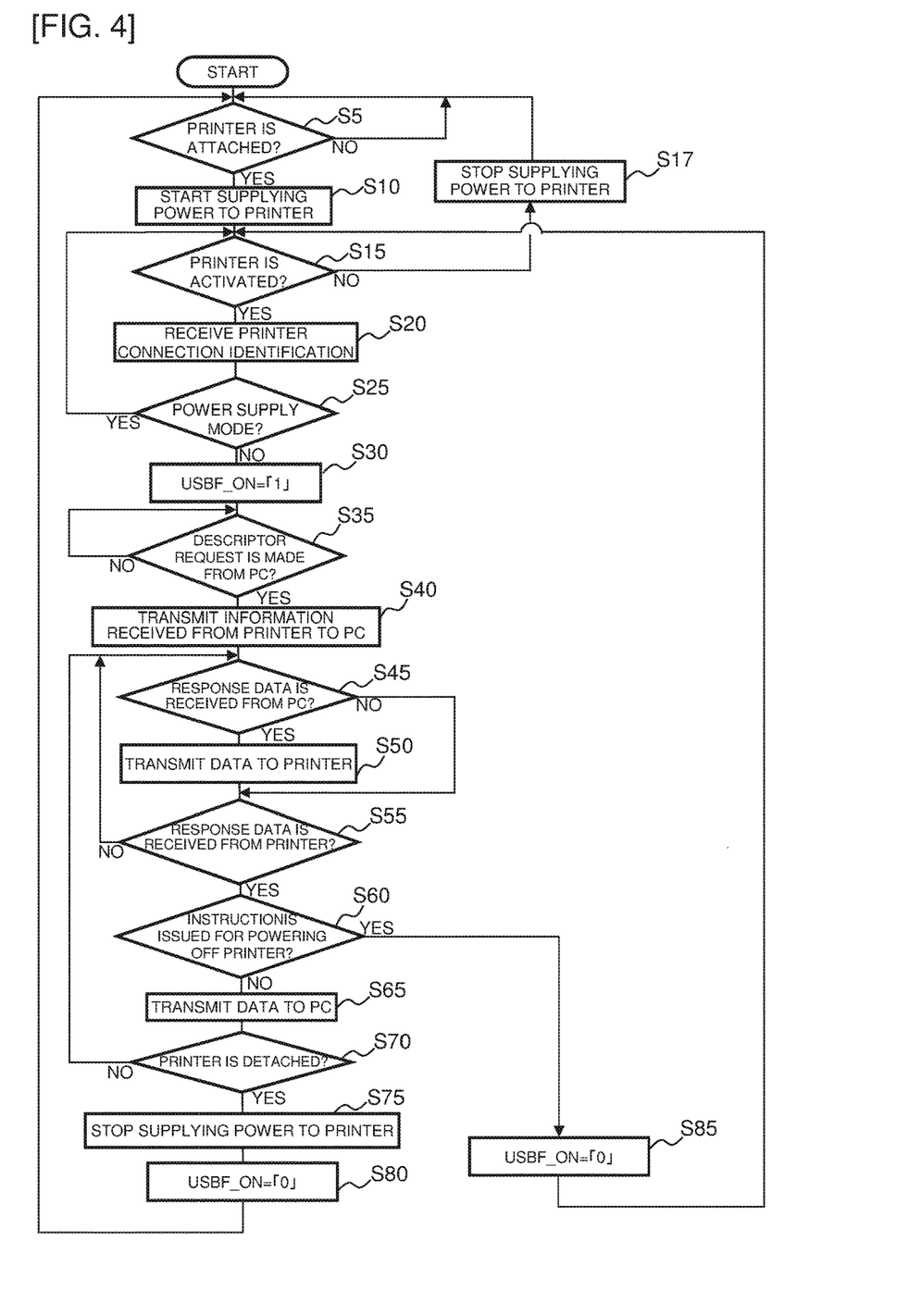
FIG. 4 is a flowchart showing a control procedure executed by the CPU of the cradle apparatus.

FIG. 4 is a flowchart showing a control procedure executed by the CPU 14 of the cradle apparatus 100.

In FIG. 4, first, at step S5, the CPU 14 determines whether or not the printer 11 is attached to the placement part 132. Specifically, as described above, it is determined whether or not the signal input from the printer detection switch 136A to the "INTP02" port is "Low". If not attached, the determination of step S5 is negative (S5:NO), and the CPU 14 waits in a loop until the printer 11 is attached to the placement part 132. When the printer 11 is attached to the placement part 132, the determination of step S5 becomes affirmative (S5:YES), and the procedure goes to step S10. The process executed at step S5 corresponds to an example of an attachment determination process described in claims, and step S5 corresponds to an example of an attachment determination step.

At step S10, the CPU 14 starts supplying power to the printer 11. Specifically, as described above, the signal "1" is output from the "P60" port of the CPU 14 to the FET 21, and the FET 21 is turned on. Therefore, power is supplied from the DC jack 135 connected to the external power source via the FET 21 and the connector terminal 133 to the ADP port of the CPU 12 of the printer 11. Step S10 corresponds to an example of a power supply start step described in claims.

Subsequently, the procedure goes to step S15, and the CPU 14 determines whether or not the printer 11 is activated by a known appropriate method. If not activated, the determination of step S15 is negative (S15:NO), and the procedure goes to step S17. Step S15 corresponds to an example of a start determination step described in claims.

At step S17, the CPU 14 stops power supply to the printer 11. Specifically, as described above, the signal "0" is output from the "P60" port of the CPU 14 to the FET 21, and the FET 21 is turned off. As a result, the power supply to the "ADP" port of the CPU 12 via the FET 21 and the connector terminal 133 is stopped as described above. Step S17 corresponds to an example of a power supply stop step described in claims. Subsequently, the procedure returns to step S5 to repeat the same procedure.

On the other hand, if the printer 11 is activated at step S15, the determination at step S15 is affirmative (S15:YES), and the procedure goes to step S20. At step S20, the CPU 14 receives at the "RXDC3" port the connection identification information of the printer 11 output from the "TXD" port of the CPU 12 of the printer 11. This connection identification information includes, for example, at least one of a vendor ID, a product ID, a vendor string, a product string, a device ID, and a serial number related to the printer 11 (see also FIG. 5. The process executed at step S20 corresponds to an example of an information acquisition process described in claims, and step S20 corresponds to an example of an information acquisition step.

Subsequently, the procedure goes to step S25, and the CPU 14 determines whether or not the cradle apparatus 100 is in a power supply mode for supplying only power to the printer 11. Specifically, when the printer 11 is attached to the placement part 132 as described above, the cradle apparatus 100 has two operation modes, which are the power supply mode for supplying only power to the printer 11 and a normal mode for transmitting/receiving information to/from the printer 11 as described above in addition to the power supply. Either of the two operation modes is selectively set, for example, through an appropriate operation of the user on the operation terminal (abbreviated as "PC" as appropriate in FIG. 4) 10 or the printer 11. At step S25, it is determined by the user whether or not the power supply mode is set. If the power supply mode is set, the determination of step S25 is affirmative (S25:YES), and the procedure returns to step S15 to repeat the same procedure. If the normal mode is set instead of the power supply mode, the determination of step S25 is negative (S25:NO), and the procedure goes to step S30. Step S25 may be executed before step S20 (in other words, after step S15). In this case, if the determination of step S25 is negative, the procedure goes to step S20.

At step S30, the CPU 14 outputs the "USBF_ON" signal of "1" from the port "P21" of the CPU 14 as described above to turn on the logic gate 16 (into a signal transmission state). As described above, this enables the signal transmission from the "VBUS" port of the USB jack 17 to the "INTP05" port of the CPU 14, and the communication connection (electrical connection) using the USB cable UC1 is established between the cradle apparatus 100 and the operation terminal 10. The process executed at step S30 corresponds to an example of a connection establishment process described in claims, and step S30 corresponds to an example of a connection establishing step.

Subsequently, the procedure goes to step S35.

At step S35, the CPU 14 determines whether or not a request is made from the operation terminal 10 for a descriptor such as a device/string/device ID (data describing a property and a handling method of data and files). If the request is not made, the determination at step S35 is negative (S35:NO), and the CPU 14 waits in a loop until the request is made. If the request is made, the determination of step S35 becomes affirmative (S35:YES), and the procedure goes to step S40.

At step S40, the CPU 14 transmits the connection identification information (in other words, USB function data) of the printer 11 acquired at step S20 from the "UDPF" and "UDMF" ports through the "D+" and "D-" ports of the USB jack 17 respectively connected thereto, and the USB cable UC1, to the operation terminal 10. The process executed at step S40 corresponds to an example of an information transmission process described in claims, and step S40 corresponds to an example of an information transmission step. Subsequently, the procedure goes to step S45.

At step S45, the CPU 14 determines whether appropriate response data (not described in detail) from the operation terminal 10 corresponding to the reception of the transmitted information is received at the "UDPF" and "UDMF" ports through the USB cable UC1 and the "D+" and "D-" ports on the basis of the information transmission at step S40. If the response data is not received, the determination of step S45 is negative (S45:NO), and the procedure goes to step S55 described later. If the response data is received, the determination of step S45 is affirmative (S45:YES), and the procedure goes to step S50.

At step S50, the CPU 14 transmits appropriate data (not described in detail) corresponding to the reception of the response data at step S45 from the "TXDC3" port through the "TXD" port of the connector terminal 13 to the "RXD" port of the CPU 12 of the printer 11. Subsequently, the procedure goes to step S55.

At step S55, the CPU 14 determines whether appropriate response data (not described in detail) from the operation terminal 10 corresponding to the reception of the transmitted data is received at the "RXDC3" port on the basis of the data transmission at step S50. If the response data is not received, the determination of step S55 is negative (S55:NO), and the procedure returns to step S45 to repeat the same procedure. If received, the determination of step S55 is affirmative (S55:YES), and the procedure goes to step S60.

At step S60, the CPU 14 determines whether or not an instruction for powering off the printer 11 is issued by a user's operation on an appropriate operation part of the printer 11. If an instruction for powering off is issued, the determination of step S60 is affirmative (S60:YES), and the procedure goes to step S85.

At step S85, the CPU 14 outputs the "USBF_ON" signal of "0" from the "P21" port to turn off the logic gate 16 (into a signal cutoff state). As described above, this disables the signal transmission from the "VBUS" port of the USB jack 17 to the "INTP05" port of the CPU 14, and the communication connection (electrical connection) established at step S30 is disconnected between the cradle apparatus 100 and the operation terminal 10. Step S85 corresponds to an example of a first connection disconnecting step described in claims. Subsequently, the procedure returns to the above step S15 to repeat the same procedure.

On the other hand, if it is determined at step S60 that no instruction for powering of the printer 11 is issued, the determination of step S60 is negative (S60:NO), and the procedure goes to step S65.

At step S65, on the basis of the information reception at step S55, the CPU 14 transmits corresponding appropriate response data (not described in detail) through the "UDPF" and "UDMF" ports, the "D+" and "D-" ports, and the USB cable UC1 to the operation terminal 10. Subsequently, the procedure goes to step S70.

At step S70, the CPU 14 determines whether or not the printer 11 is detached from the placement part 132. Specifically, as described above, it is determined whether or not the signal input to the "INTP02" port from the printer detection switch 136A is "High". If still attached, the determination of step S70 is negative (S70:NO), the procedure returns to step S45 to repeat the same procedure. If the printer 11 is detached from the placement part 132, the determination of the step S70 is affirmative (S70:YES), and the procedure goes to step S75.

At step S75, the CPU 14 stops supplying power to the printer 11. Therefore, similarly to step S17, the signal "0" is output from the "P60" port to the FET 21 to turn off the FET 21, and the power supply to the "ADP" port of the CPU 12 via the connector terminal 133 is stopped. Subsequently, the procedure goes to step S80.

At step S80, similarly to step S85, the CPU 14 outputs the "USBF_ON" signal of "0" from the "P21" port to turn off the logic gate 16 (into a signal cutoff state). As a result, the communication connection (electrical connection) established at step S30 is disconnected between the cradle apparatus 100 and the operation terminal 10 as in the above description. Step S80 corresponds to an example of the second connection disconnecting step described in claims. Subsequently, the procedure returns to step S5 to repeat the same procedure.

<Detailed Sequence>

Figure 5:
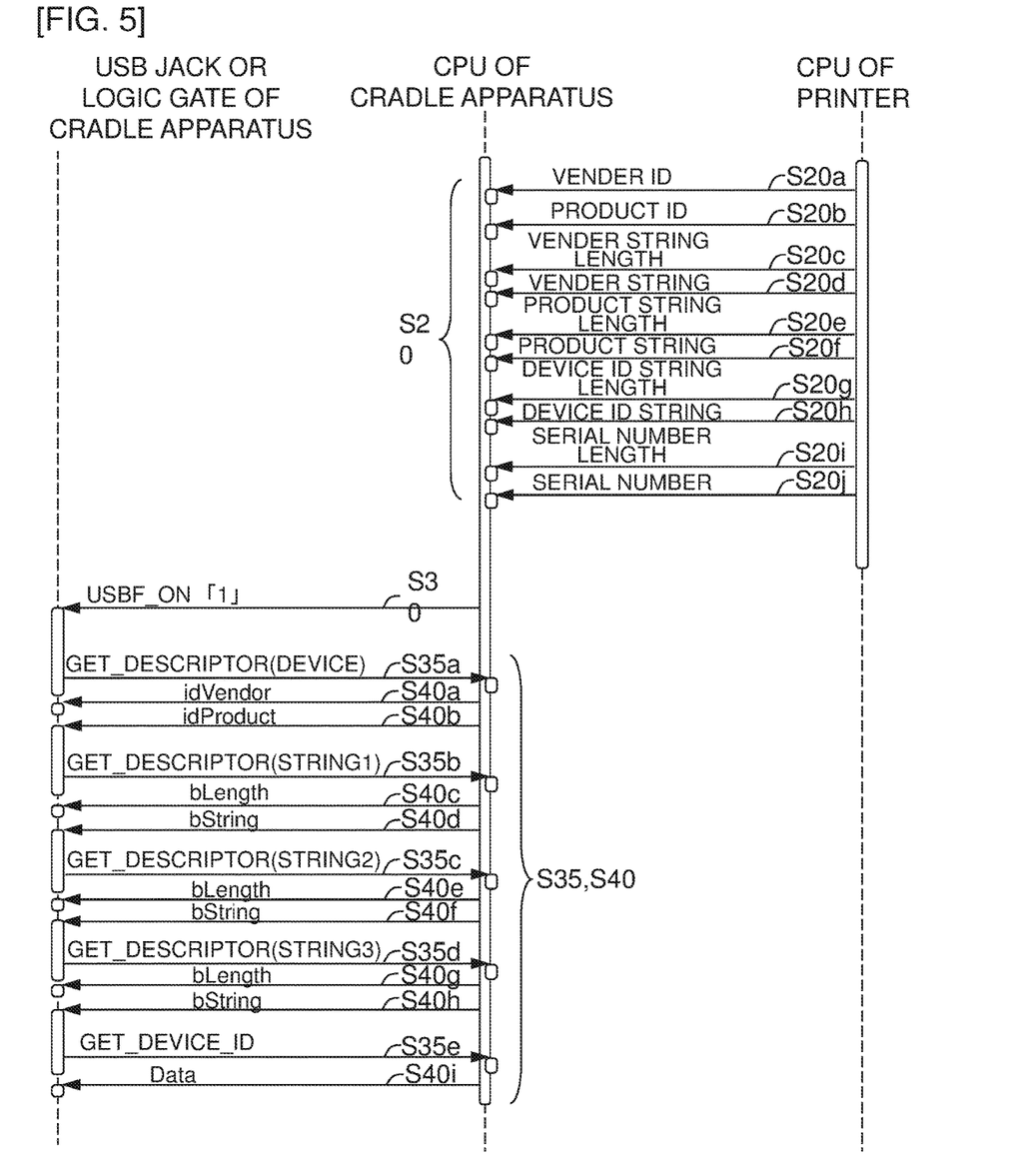
FIG. 5 is a sequence diagram showing detailed contents of steps S20, S30, S35, and S40 of FIG. 4.

FIG. 5 is a sequence diagram showing detailed contents of steps S20, S30, S35, and S40 of FIG. 4.

As shown in FIG. 5, in this example, step S20 specifically includes steps S20a to S20j in this order. Therefore, at step S20a, the vender ID of the printer 11 is transmitted as the connection identification information from the "TXD" port of the CPU 12 to the "RXDC3" port of the CPU 14 of the cradle apparatus 100. Similarly, the product ID is transmitted at step S20b; the vendor string length is transmitted at step S20c; the vendor string is transmitted at step S20d; the product string length is transmitted at step S20e; the product string is transmitted at step S20f; the device ID string length is transmitted at step S20g; the device ID string is transmitted at step S20h; the serial number length is transmitted at step S20i; and the serial number is output at step S20j. It is not necessary to execute all of these steps S20a to 20j, and at least one of the steps may be executed.

At step S30, as described above, the "USBF_ON" signal of "1" is transmitted from the "P21" port of the CPU 14 of the cradle apparatus 100 to the logic gate 16.

Step S35 specifically includes steps S35a to S35e, and the step S40 specifically includes steps S40a to S40i. As shown in the figure, in this example, steps S35a, S40a, S40b, S35b, S40c, S40d, S35c, S40e, S40f, S35d, S40g, S40h, S35e, and S40i are executed in this order in time series.

Therefore, in response to the transmission of "GET DESCRIPTOR (DEVICE)" as the descriptor request from the USB jack 17 to the CPU 14 at step S35a, the vender ID of the printer 11 received at step S20a is transmitted at step S40a from the "UDPF" and "UDMF" ports of the CPU 14 to the "D+" and "D-" ports of the USB jack 17, and the product ID received at step S20b is transmitted at step S40b.

Similarly, in response to the transmission of "GET DESCRIPTOR (STRING1)" from the USB jack 17 to the CPU 14 at step S35b, the vendor string length of the printer 11 received at step S20c is transmitted at step S40c, and the vendor string received at step S20d is transmitted at step S40d.

Similarly, in response to the transmission of "GET DESCRIPTOR (STRING2)" from the USB jack 17 to the CPU 14 at step S35c, the product string length of the printer 11 received at step S20e is transmitted at step S40e, and the product string received at step S20f is transmitted at S40f.

Similarly, in response to the transmission of "GET DESCRIPTOR (STRING3)" from the USB jack 17 to the CPU 14 at step S35d, the serial number length of the printer 11 received at step S20i is transmitted at step S40g, and the serial number received at step S20j is transmitted at S40h.

Similarly, in response to the transmission of "GET_DEVICE_ID" from the USB jack 17 to the CPU 14 at step S35e, the device ID string of the printer 11 received at step S20h is transmitted at step S40j.

In the above description, the arrows shown in FIG. 2 indicate an example of a signal flow and are not intended to limit the signal flow directions.

The flowchart shown in FIG. 4 is not intended to limit the present disclosure to the procedures shown in the flow, and the procedures may be added/deleted or may be executed in different order without departing from the spirit and the technical ideas of the disclosure.

The techniques of the embodiment and modification examples may appropriately be utilized in combination other than those described above.

Although not exemplarily illustrated one by one, the present disclosure is implemented with various modifications applied without departing from the spirit thereof.

What is claimed is:

1. A non-transitory computer-readable recording medium storing a cradle control program for executing steps on a CPU of a cradle apparatus including an attach/detach part configured to allow attachment of a printer in an information transmittable/receivable manner, a connection part configured to be wired in an information transmittable/receivable manner to an operation terminal for operating said printer, and said CPU, said steps comprising:
    an attachment determination step for determining whether or not said printer is attached to said attach/detach part,
    an information acquisition step for acquiring connection identification information of said printer in a case that, in said attachment determination step, it is determined said printer is attached,
    a connection establishing step for establishing a communication connection with said operation terminal via said connection part after acquiring said connection identification information in said information acquisition step,
    an information transmission step for transmitting to said operation terminal, said connection identification information acquired in said information acquisition step after establishing said communication connection in said connection establishing step, and
    a power supply start step for starting power supply to said printer in the case that, in said attachment determination step, it is determined said printer is attached,
    an activation determination step for determining whether or not said printer is activated after said power supply start step, and
    said information acquisition step in a case that, in said activation determination step, it is determined said printer is activated, or a power supply stop step for stopping power supply to said printer started in said power supply start step in a case that, in said activation determination step, it is determined that said printer is not being activated.

2. The recording medium according to claim 1,
    wherein said cradle apparatus further comprises a detection device configured to detect an attachment of said printer on said attach/detach part, and
    wherein in said attachment determination step, based on a detection result of said detection device, it is determined whether or not said printer is attached to said cradle apparatus.

3. The recording medium according to claim 1, wherein said connection identification information includes at least one of a vendor ID, a product ID, a vendor string, a product string, a device ID, and a serial number, of said printer.

4. The recording medium according to claim 1, wherein said steps further comprise a connection disconnecting step for disconnecting the communication connection with said operation terminal established in said connection establishing step in a case that said printer attached to said attach/detach part is powered off.

5. The recording medium according to claim 1, wherein said steps further comprise a connection disconnecting step for disconnecting the communication connection with said operation terminal established in said connection establishing step in a case that said printer is detached from said attach/detach part.

6. A cradle apparatus comprising:
    an attach/detach part configured to allow attachment of a printer in an information transmittable/receivable manner;
    a connection part configured to be wired in an information transmittable/receivable manner to an operation terminal for operating said printer; and
    a CPU, said CPU being configured to execute
        an attachment determination process for determining whether or not said printer is attached to said attach/detach part,
        an information acquisition process for acquiring connection identification information of said printer in a case that, in said attachment determination process, it is determined that said printer is attached,
        a connection establishing process for establishing a communication connection with said operation terminal via said connection part after acquiring said connection identification information in said information acquisition process,
        an information transmission process for transmitting to said operation terminal said connection identification information acquired in said information acquisition process after establishing said communication connection in said connection establishing process,
        a power supply start process for starting power supply to said printer in the case that, in said attachment determination process, it is determined said printer is attached,
        an activation determination process for determining whether or not said printer is activated after said power supply start process, and
        said information acquisition process in a case that, in said activation determination process, it is determined said printer is activated, or a power supply stop process for stopping power supply to said printer started in said power supply start process in a case that, in said activation determination process, it is determined that said printer is not being activated.

* * * * *